W. E. WILLIAMS.
TOOL FOR LOCKING NUTS.
APPLICATION FILED JAN. 21, 1916.
1,300,207.
Patented Apr. 8, 1919.
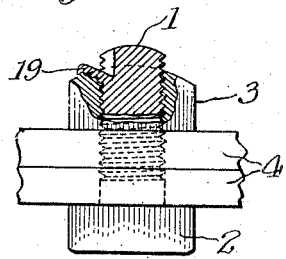
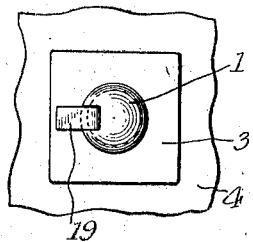
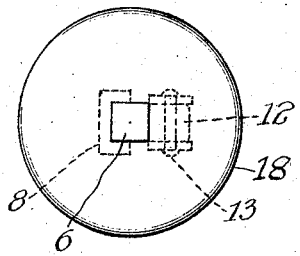
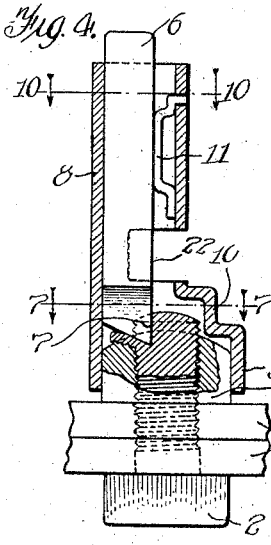
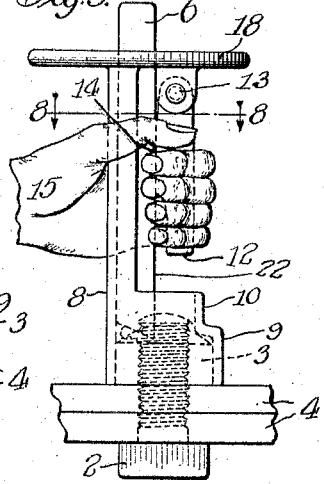
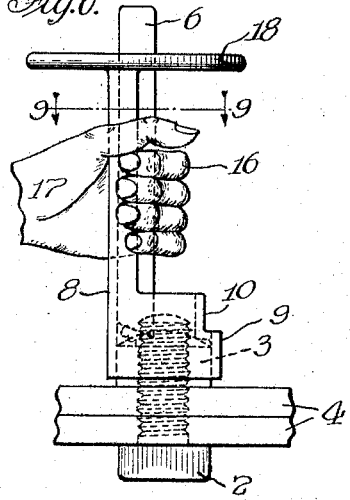
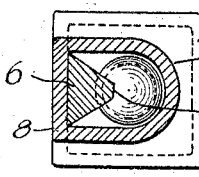
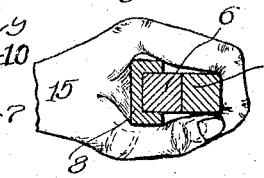
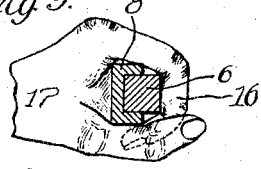
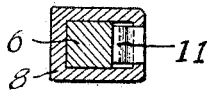
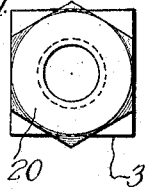
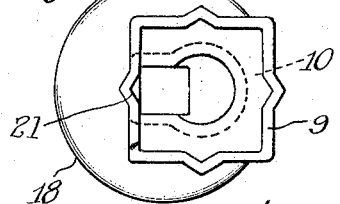

UNITED STATES PATENT OFFICE.

WILLIAM ERASTUS WILLIAMS, OF CHICAGO, ILLINOIS.

TOOL FOR LOCKING NUTS.

1,300,207.  Specification of Letters Patent.  Patented Apr. 8, 1919.

Application filed January 21, 1916. Serial No. 73,316.

*To all whom it may concern:*

Be it known that I, WILLIAM ERASTUS WILLIAMS, a citizen of the United States, and a resident of Chicago, county of Cook, and State of Illinois, have invented a new and useful Improvement in Tools for Locking Nuts, of which the following is a specification.

The object of my invention to to provide the cheapest and most expeditious possible method and a tool therefor with which to lock nuts on bolt ends against loosening. I do this by cutting out or swaging with a tool a small section or segment or lip from the bolt end out into or over the edge of the threads of the nut, thereby locking the nut from becoming loose.

Reference will be had to the accompanying drawings in which—

Figure 1 is an elevation of a bolt partly in section locked by my method and tool.

Fig. 2 is a plan view of the devices shown in Fig. 1.

Fig. 3 is a plan view of the devices shown in Fig. 5.

Fig. 4 is a vertical sectional elevation of one form of my tool in position of locking a nut by my method.

Fig. 5 is an elevation of a modified form of my invention.

Fig. 6 is an elevation of another modified form of the invention.

Fig. 7 is a section on line 7—7 of Fig. 4.

Fig. 8 is a section on line 8—8 of Fig. 5.

Fig. 9 is a section on line 9—9 of Fig. 6.

Fig. 10 is a section on line 10—10 of Fig. 4.

Fig. 11 is a plan of a hexagon nut upon a square nut.

Fig. 12 is a bottom end view of my tool as shown in Figs. 5 and 6 when the socket end has been shaped to fit over both square and hexagon nuts.

In the drawings 1 indicates an ordinary bolt having a head 2, a nut 3 and binding together the parts 4.

The nut 3 after it has been seated home on the bolt is locked against movement by cutting out a segment or lip 19 and bending it out over the edge of the nut, at the same time the metal at the root of the segment or lip is compressed or swaged down and outward binding the bolt into the nut threads.

I accomplish this method with my tool which is composed of a chisel 6 provided with a cutting point 7 and held in sliding contact within a holder or handle 8. The lower end of the holder terminates in a socket 9 adapted to fit loosely over the nut. Above the socket 9 there is a secondary socket 10 adapted to engage the bolt end.

In Figs. 4 and 10 a spring 11 is provided to hold the chisel 6 against rebound when it is being driven with a hammer in cutting the lip or segment.

In use the tool is placed over the nut and bolt end which constitute the structure to be operated upon and the chisel is driven down with a hammer or by any suitable means during which the chisel point 7 cuts out and bends over the segment or lip 19 and compresses the metal outward at the root of the segment or lip, thus making the bolt tight in the nut and locking the nut.

In Fig. 5 I provide a hand lever 12 hinged at 13 to the top of the holder or handle and this lever is grasped by the hand 15 of the operator, thereby binding the lever in contact with the chisel along the surface 14.

In Fig. 6 both the spring 11 and lever 12 are wanting and the fingers 16 of the hand 17 of the operator holds the chisel in place. In all three of the forms as shown in Figs. 4, 5 and 6 the fingers may be used to hold the chisel when desired by applying the fingers on the surface 22 of the chisel.

In Figs. 5 and 6 I provide a shield or guard plate 18 to protect the hand of the operator from false blows of the hammer when striking the end of the chisel.

Square and hexagon nuts are approximately the same size as relates to their parallel edges as is indicated by Fig. 11 wherein 20 is a hexagon nut on top of a square nut 3. By making the socket end of my tool as is shown in Fig. 12 with notches 21 adapted to go over the corner of hexagon nut the same tool may be used on both square and hexagon nuts.

Nuts after having been locked by my method may be easily screwed up tighter when occasion requires and again locked with my tool driving the chisel in the same or a new place on the bolt end. When desired the nut after being locked may be screwed off with a wrench and in doing this the lip or segment 19 is bent backward more or less upward from its root home from whence it came and the outer end of it breaks off more or less depending on the nature of the metal of the bolt. Neither the threads of the nut nor those on the bolt end are appreciably injured by reason of the taking off of a nut after it has been locked by my method, and the nut is easily screwed on again and may be relocked in the same manner as before, either in the same or a new place on the bolt end. The protruding end of a bolt serves no useful purpose that it will not serve after one or two lips or segments have been made in it by my method of locking the nut.

In cases where the end of a bolt does not protrude beyond the face of the nut I lock the nut just the same way by driving the chisel end down into the bolt end, thus swaging out a segment tightly into the nut threads, making such a tight fit as will lock the nut from coming loose.

An operator in locking nuts with my method and tool may do so with the exercise of little or no skill and with rapidity and at the same time do efficient work.

What I claim is—

1. The combination with a guide member having an extension for laterally engaging the nut and bolt structure to be operated upon and maintaining the distance of the member from the axis of the bolt, and further having a way at one side of the bolt's axis and approximately parallel thereto when the member is in operative position, of a cutter movable in said way toward the end of the bolt and beveled to a cutting edge at the side nearest said axis and lying between the latter and the surface elements of the bolt; whereby the forcible advance of the cutter may force outward a narrow nut-locking segment of the peripheral portion of the bolt.

2. The combination with a guide structure adapted to fit over the end of a bolt and the nut thereon, of a chisel sliding in said structure parallel to the axis of the bolt, having its bevel turned from the said axis and its cutting edge at some distance therefrom, whereby the advance of the chisel may cut and force outward from the end portion of the bolt a relatively narrow and shallow segment.

3. The combination with a structure adapted to be passed over the end portion of a bolt bearing a nut and provided with a way for guiding a sliding chisel, of a frictionally held chisel lying in said way, of a width equal to a small portion of the bolt's diameter and having its cutting edge between the axis and periphery of the bolt, whereby forcible advance of the chisel may cut and bend outward from the end portion of the bolt a narrow and shallow segment.

4. In devices of the class described, the combination with a guide member having a portion to be encircled by the hand of the user and provided with a way for a chisel, of a reciprocating chisel mounted in said way, with its cutting edge at one side of the axial line of the bolt, and arranged to be pressed against the side of said way by the hand grasping said member.

5. In devices of the class described, the combination with a guide member, to be encircled by the hand of the operator, for positioning a chisel by lateral contact of its lower end with the nut and bolt structure to be operated upon, of a reciprocating chisel mounted in said member and by it guided against the peripheral portion of the bolt's end when advanced by hammer blows, and a guard fixed to said member above the place of the grasping hand, substantially as set forth.

Signed in Chicago, in the State of Illinois, and the county of Cook this 17th day of January 1916.

WILLIAM ERASTUS WILLIAMS.

Witnesses:
  N. P. WILSON,
  R. F. McMAHON.

Copies of this patent may be obtained for five cents each, by addressing the "Commissioner of Patents, Washington, D. C."